United States Patent
Asato

(10) Patent No.: US 6,289,442 B1
(45) Date of Patent: Sep. 11, 2001

(54) CIRCUIT AND METHOD FOR TAGGING AND INVALIDATING SPECULATIVELY EXECUTED INSTRUCTIONS

(75) Inventor: Creigton Asato, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/166,037

(22) Filed: Oct. 5, 1998

(51) Int. Cl.$^7$ ............................................... G06F 9/26

(52) U.S. Cl. ..................... 712/239; 712/206; 712/216; 712/235

(58) Field of Search ........................... 712/234, 218, 712/23, 200, 216, 239, 233, 215, 237, 206, 240, 217; 364/239, 254

(56) References Cited

U.S. PATENT DOCUMENTS

| | | |
|---|---|---|
| 3,577,189 | 5/1971 | Cocke et al. . |
| 4,674,063 | 6/1987 | Sato . |
| 4,777,587 | 10/1988 | Case et al. . |
| 5,142,634 | 8/1992 | Fite et al. . |
| 5,404,470 * | 4/1995 | Miyake ................. 712/217 |
| 5,423,048 * | 6/1995 | Jarer ..................... 712/207 |
| 5,469,449 | 11/1995 | Park . |
| 5,471,591 | 11/1995 | Edmondson et al. . |
| 5,664,135 | 9/1997 | Schlansker et al. . |
| 5,796,997 * | 8/1998 | Lesartre et al. ........ 712/234 |
| 5,799,167 * | 8/1998 | Lesartre ................ 712/218 |
| 5,799,180 * | 8/1998 | Shiell et al. .......... 712/234 |
| 5,805,853 * | 9/1998 | White et al. ........... 712/218 |
| 5,954,815 * | 9/1999 | Joshi et al. ............ 712/237 |

FOREIGN PATENT DOCUMENTS 0 778 519   6/1997   (EP) .

OTHER PUBLICATIONS

McFarling, "Combining Branch Predictors," WRL Technical Note TN–36, Jun. 1993, pp. 1–20.

Johnson of Advanced Micro Devices, Inc., "Superscaler Microprocessor Design," PTR Prentice Hall, Inc., 1991, pp. 69–71.

Riseman, et al., "The Inhibitor of Potential Parallelism by Conditional Jumps," Short Notes: IEEE Transactions on Computers, Dec. 1972, pp. 1405–1411.

(List continued on next page.)

*Primary Examiner*—Thomas Lee
*Assistant Examiner*—Thuan Su
(74) *Attorney, Agent, or Firm*—Conley, Rose & Tayon, PC; Lawrence J. Merkel

(57) ABSTRACT

A method and circuit is disclosed for tagging and invalidating speculatively executed instructions. The method includes fetching a first plurality of instructions which includes a conditional branch instruction which identifies a target address if the branch is taken. The conditional branch instruction is detected and in response thereto first and second instruction tags are generated. At least a first instruction is tagged with the first instruction tag wherein the first instruction is included in the first plurality of instructions and wherein the first instruction sequentially follows the first conditional branch instruction in program order. Thereafter, a second plurality of instructions are fetched wherein the second plurality of instructions corresponds to the target address of the conditional branch instruction. At least one of these second plurality of instructions is tagged with the second instruction tag. Thereafter, the conditional branch instruction is executed and resolved. A branch status operand is generated in response to executing the conditional branch instruction wherein the branch status operand indicates whether the conditional branch instruction is resolved as taken or not taken. The generated branch status operand is compared against the first and second instruction tags. In response to comparing the branch status operand, one of the first and second instructions is invalidated indicating that it was within the wrong program path of execution.

26 Claims, 6 Drawing Sheets

OTHER PUBLICATIONS

Halfhill, "Beyond Pentium II," BYTE Magazine—Dec. 1997, downloaded and printed from www.byte.com on Oct. 5, 1998, 9 pages.

Lee, "Branch Prediction Strategies and Branch Target Buffer Design," Computer, Jan. 1984, pp. 6–22.

Klauser et al., "Selective Eager Execution on the PolyPath Architecture," Computer Architecture News, vol. 26, No. 3, Jun. 1998, pp. 250–259.

Gonzales, "A survey of branch techniques in pipelined processors," Microprocessing & Microprogramming, vol. 36, No. 5, Oct. 1993, pp. 243–257.

Riseman et al., "The inhibition of Potenial Parallelism by Conditional Jumps," Transactions on Computers, vol. C21, Dec. 1972, pp. 1405–1411.

Lilja, "Reducing the Branch Penalty in Pipelined Processors," Computer, vol. 21, No. 7, Jul. 1988, pp. 45–55.

International Search Report, Application No. PCT/US99/15397, mailed Oct. 25, 1999.

Liu et al, "Branch–Directed and Stride–Based Data Cache Prefetching" Computer Design: VLSI in Computers and Processors, 1996. ICCD '96. Proceedings., 1996 IEEE International Conference on, 1996, pp. 225–230.*

* cited by examiner

| | |
|---|---|
| A3 Taken | 00 11 00 00 |
| A3 Not Taken | 00 10 00 00 |
| | |
| B3 Taken | 00 00 00 11 |
| B3 Not Taken | 00 00 00 10 |
| | |
| B4 Taken | 00 00 11 00 |
| B4 Not Taken | 00 00 10 00 |
| | |
| A3 Taken and | |
| B3 Not Taken | 00 11 00 10 |
FIG. 6C
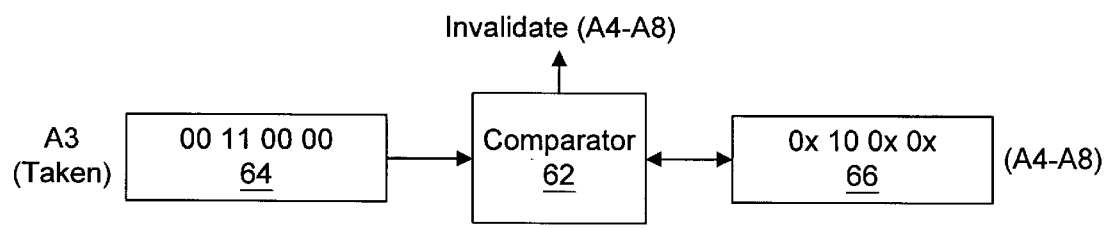
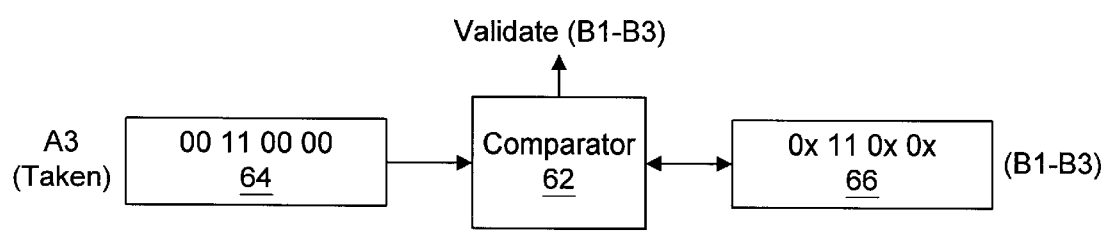
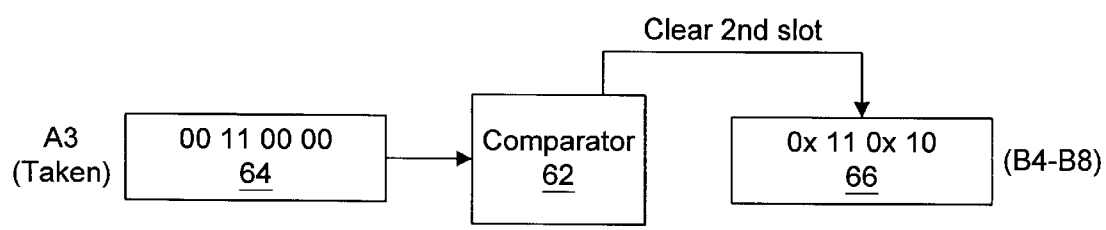
FIG. 7

CIRCUIT AND METHOD FOR TAGGING AND INVALIDATING SPECULATIVELY EXECUTED INSTRUCTIONS

CROSS REFERENCE TO RELATED APPLICATIONS

This application is related to U.S. patent application Ser. No. 09/166,440, filed Oct. 5, 1998, Ser. No. 09/085,188, filed May 26, 1998, and Ser. No. 09/132,640, filed Aug. 11, 1998.

BACKGROUND OF THE INVENTION

1. Field of the Invention

This invention relates to superscalar microprocessors and, more particularly, a superscalar microprocessor in which speculatively executed instructions are tagged and invalidated.

2. Description of the Relevant Art

Microprocessors can be implemented on one or a very small number of semiconductor chips. Semiconductor chip technology is increasing circuit densities. Speeds within microprocessors are increasing with the use of scalar computation with superscalar technology being the next logical step in the evolution of microprocessors. The term superscalar describes a computer implementation that includes performance by a concurrent execution of scalar instructions. Scalar instructions are the type of instructions typically found in general purpose microprocessors. Using today's semiconductor processing technology, a single microprocessor chip can incorporate high performance techniques that were once applicable only to large scale scientific processors.

Microprocessors run application programs. An application program comprises a group of instructions. In running application programs, microprocessors fetch and execute the instructions in some sequence. There are several steps involved in executing a single instruction, including fetching the instruction, decoding it, assembling the necessary operands, performing the operations specified by the instruction, and writing the results of the instruction to storage. These steps are controlled by a periodic clock signal. The period of the clock signal is the processor cycle time.

The time taken by a microprocessor to complete a program is determined by three factors: the number of instructions required to execute the program; the average number of processor cycles required to execute an instruction; and the processor cycle time. Microprocessor performance is improved by reducing the time taken by the microprocessor to complete the program, which dictates reducing one or more of these factors.

One way to improve the performance of the microprocessor is by overlapping the steps of different instructions, using a technique called pipelining. In pipelining, the various steps of instruction execution are performed by independent units called pipeline stages. Pipeline stages are generally separated by clock registers, and the steps of different instructions are executed independently in different pipeline stages. Pipelining reduces the average number of cycles required to execute an instruction, though not the total amount of time required to execute an instruction, by overlapping instructions and thus permitting the processor to handle more than one instruction at a time. Pipelining reduces the average number of cycles per instruction by as much as a factor of 3. However, when executing a conditional branch instruction, the pipeline may sometimes stall until the result of the conditional branch operation is known (resolved) and the correct next instruction is fetched for execution. This stall is known as branch delay penalty.

A typical pipelined scalar microprocessor executes one instruction per processor cycle. A superscalar microprocessor reduces the average number of cycles per instruction beyond what is possible in a pipelined scalar processor by allowing concurrent execution of instructions in the same pipeline as well as concurrent execution of instructions in different pipelines.

While superscalar processors are simple in theory, there is more to achieving increased performance then simply increasing the number of pipelines. Increasing the number of pipelines makes it possible to execute more than one instruction per cycle, but there is no guarantee that any given sequence of instructions can take advantage of this capability. Instructions are not always independent of one another, but are often interrelated. These interrelationships prevent some instructions from occupying the same pipeline stage. Furthermore, the processor's mechanisms for decoding and executing instructions can make a difference in its ability to discover instructions that can be executing simultaneously.

A program counter (PC) also called an instruction pointer (IP), identifies the memory address of instructions to be fetched from memory and executed. The program counter mechanism for maintaining and updating the program counter value includes an incrementer, a selector, and a register. As each instruction is fetched and decoded, an address of the next sequential instruction is formed by adding the byte length of the current instruction to the value of the program counter using the incrementer and placing this next sequential instruction in the register. When a branch is taken, the address of the target instruction is selected by the selector instead of the incremented value and this target address is placed in the register.

Branch prediction mechanisms are often employed in superscalar microprocessors to predict the outcome of a conditional branch and to have the processor pursue the likely execution path prior to decode and subsequent execution of the conditional branch instruction. At any point within the path of execution, if the processor determines that a prediction was incorrect, the microprocessor backs up in the instruction stream and proceeds down the correct path. There is a penalty for employing branch prediction mechanisms within a microprocessor. The penalty relates to instructions completed after the conditional branch is predicted but before the branch outcome is actually determined. These completed instructions are discarded, after a branch misprediction and the time that the processor spent executing them is wasted.

The prior art has suggested a method for limiting or completely avoiding the penalty associated with branch misprediction. More particularly, the prior art suggests that the superscalar microprocessor pursue both paths (i.e., the sequence of instructions if the conditional branch instruction is taken or the sequence of instructions if the conditional branch instruction is not taken) to ensure that the microprocessor always executes the correct instruction sequence when it determines the outcome of the branch. In this scenario, the microprocessor will simply discard the results of the incorrect path.

To sufficiently pursue both instruction paths at a branch, the microprocessor must have enough resources to pursue both paths, i.e., double the number of decoders and functional units, and so on. While the prior art suggests pursuing both instruction paths at a conditional branch instruction, the prior art fails to teach or fairly suggest a means for implementing and managing dual path instruction execution at a conditional branch.

SUMMARY OF THE INVENTION

The problems outlined above are in large part solved by a superscalar microprocessor employing a method of tagging and invalidating speculatively issued instructions. In one embodiment, the method tags first and second instructions with first and second instruction tags in response to detecting a conditional branch instruction. The first instruction tag contains information identifying that the associated first instruction is in correct program order if the conditional branch instruction is taken. The second instruction tag contains information indicating that the associated second instruction is in correct program order if the conditional branch instruction is not taken. Eventually, the conditional branch instruction is executed and resolved as to whether the conditional branch instruction is taken or not taken. In response, a branch status operand is generated and broadcast throughout the microprocessor. The branch status operand contains information identifying whether the conditional branch instruction was taken or not taken. The broadcasted branch status operand is compared against all instruction tags associated with each issued instruction whether the issued instruction is executed or not. This includes comparing the branch status operand with the first and second instruction tags. In response to this comparison, one of the first and second instructions is invalidated as being within the wrong instruction path.

The first and second instruction tags comprise 2n-bits. Each instruction tag is defined by n vector slots. Each slot is configured to hold a 2-bit vector. Each 2-bit vector is configured to have a high bit and a low bit. When the conditional branch instruction is first detected, a slot is assigned to the detected conditional branch instruction. Then, the first and second instruction tags are generated by first generating first and second 2-bit vectors and placing the first and second 2-bit vector in the assigned slot. The high bit of each of these 2-bit vectors is set to 1 to indicate the associated instruction is assigned to and dependent upon the conditional branch instruction. The low bit of the first 2-bit vector is set to 1 to indicate that the first instruction associated with the first instruction tag is in the correct program order if the conditional branch instruction is taken. In contrast, the low bit of the second 2-bit vector is set to 0 to indicate that the associated second instruction is in the correct program order if the conditional branch instruction is not taken. The remaining slots of the first and second instruction tags may be filled with 2-bit vectors corresponding to previously detected conditional branch instructions.

The branch status operand also comprises 2n-bits. The branch status operand is, like the instruction tags, defined by n slots, wherein each slot is configured to hold a 2-bit vector. The branch status operand is generated in accordance with the slot assigned to the detected conditional branch instruction. When the conditional branch instruction is executed and resolved, a third 2-bit vector is generated and placed in the slot of the branch status operand which corresponds to the assigned slot of the first and second tags. The high bit of the third 2-bit vector is set to 1 to indicate the branch status operand's dependence upon the resolved conditional branch instruction. The low bit of the third 2-bit vector is set in accordance with the branch instruction's resolution. More particularly, the low bit is set to 1 if the branch instruction is resolved as taken, or the low bit is set to 0 if the branch instruction is resolved as not taken.

After the branch status operand is generated, it is broadcasted and compared against all of the instruction tags associated with issued instructions including the first and second instruction tags as described above. With respect to the first and second instruction tags, the low bit of only one of the first and second 2-bit vectors will compare equally with the low bit of the third 2-bit vector of the branch status operand. The first instruction will be invalidated if the low bit of the first 2-bit vector does not compare equally with the low bit of the corresponding third 2-bit vector. The second instruction will be invalidated if the low bit of the second 2-bit vector does not compare equally with the low bit of the third 2-bit vector.

One advantage of the present invention is that it improves performance of microprocessors.

Another advantage of the present invention is that it reduces or eliminates branch misprediction penalties.

Yet another advantage of the present invention is that it accurately manages dual path instructions issuing from a conditional branch instruction.

BRIEF DESCRIPTION OF THE DRAWINGS

Other objects and advantages of the invention will become apparent upon reading the following detailed description and upon reference to the accompanying drawings in which:

FIG. 6A illustrates a portion of an application program executable by the microprocessor of FIG. 1;

FIG. 6B illustrates instruction tags corresponding to the instructions shown in FIG. 6A generated in accordance with one aspect of the present invention;

FIG. 6C illustrates branch status operands generated for executed conditional instructions shown in FIG. 6A, and;

FIG. 7 illustrates examples of comparing certain branch status operands with instruction tags associated with the instructions in FIG. 6A.

Figure 1:
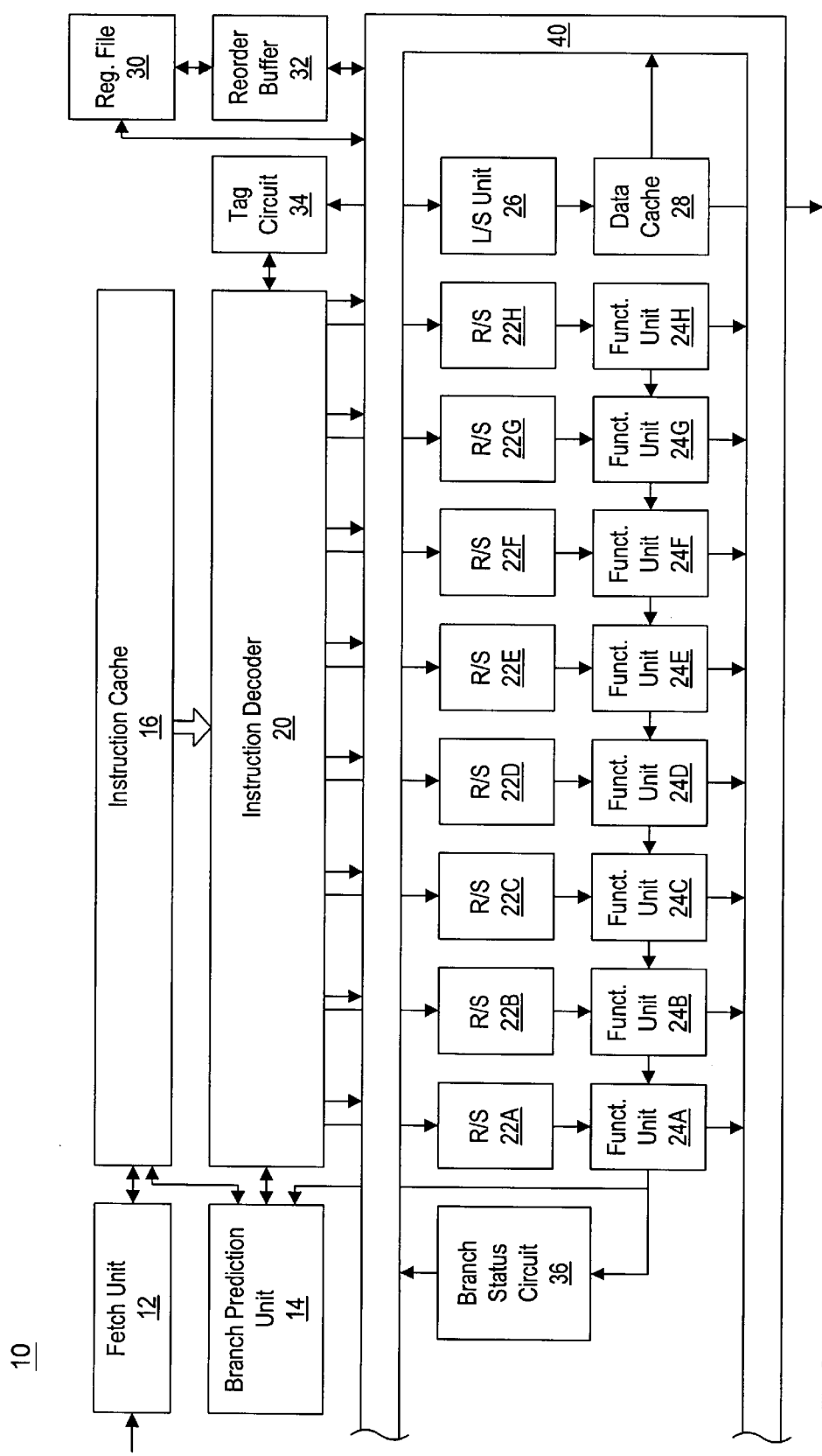
FIG. 1 is a block diagram of one embodiment of a superscalar microprocessor employing the present invention.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of a microprocessor 10 employing one embodiment of the present invention is shown. Microprocessor 10 includes a fetch unit 12, a branch prediction unit 14, instruction cache 16, a decoder 20, a plurality of reservation stations 22A–22H, a plurality of functional units 24A–24H, a load store unit 26, a data cache 28, a register file 30, a reorder buffer 32, instruction tag circuit 34, and a branch status operand circuit 36. Elements referred to herein with a particular reference number followed by a letter will be collectively referred to by the reference number alone. For example, reservation stations 22A–22H will be collectively referred to as reservation stations 22.

Fetch unit 12 is coupled to receive instructions from a main memory subsystem (not shown) and is further coupled to instruction cache 16 and branch prediction unit 14. In one embodiment of the present invention, branch prediction unit 14 is not needed in microprocessor 10 since branch prediction is eliminated by execution of spculative instructions from both paths which follow a conditional branch. However, branch prediction unit 14 will nonetheless be described herein. Branch prediction unit 14 is coupled to decoder 20 and functional units 24. Decode unit 20 is coupled to load store unit 26 and to respective reservation stations 22A–22H. Reservation stations 22A–22H are further coupled to respective functional units 24A–24H. Additionally, decoder 20 and reservation stations 22 are coupled to register file 30 and reorder buffer 32. Functional units 24 are coupled to load store unit 26, register file 30, and reorder buffer 32 as well. Data cache 28 is coupled to load store unit 26 and to the main memory subsystem.

Instruction cache 16 is a high-speed cache memory provided to store instructions. Instructions are fetched from main memory and stored into instruction cache 16 by fetch unit 12. Instructions are fetched from instruction cache 16 in blocks and dispatched to decoder 20 in accordance with a pc in fetch unit 12.

Decoder 20 is shown within FIG. 1 as a single unit. However, it is understood that decoder 20 may consist of several individual decoder units each one of which is configured to decode an instruction from the block received from instruction cache 16. In the embodiment shown in FIG. 1, decoder 20 receives blocks with 8 instructions contained therein. However, it is to be understood that the present invention should not be limited thereto. Rather, the present invention has application to microprocessor units in which a greater or lesser number of instructions are provided in each instruction block received by decoder 20. Moreover, it is also understood that the present invention should not be limited to instruction blocks containing a fixed number of instructions.

Microprocessor 10 employs an optional branch prediction unit 14 in order to speculatively execute instructions based on predicted resolutions of conditional branch instructions. Fetch unit 12 determines initial branch targets for conditional branch instructions fetched from main memory. Subsequent updates to the branch targets may occur due to the execution of branch instructions. Decoder 20 and functional units 24 provide update information to branch prediction unit 14. Functional units 24 execute the conditional branch instructions and determine whether the predicted branch direction is incorrect. The branch direction may be "taken" so that subsequent instructions are fetched from the target address of the branch instruction. Conversely, the branch direction may be "not taken" such that subsequent instructions are fetched from memory locations consecutive and subsequent to the branch instructions.

Decoder 20 is configured to decode a block of instructions received from instruction cache 16. Register operand information is detected and routed to register file 30 and reorder buffer 32. Additionally, if the instructions require one or more memory operations to be performed, decoder 20 dispatches the memory operations to load/store unit 26. Each instruction is decoded into a set of control values for functional units 24. These control values are dispatched to reservations 22 along with operand address information, displacement or immediate data which may be included within the instruction, and an instruction tag which will be more fully described below.

Microprocessor 10 supports out of order execution, and thus employs reorder buffer 32 to keep track of the original program sequence for register read and write operations, to implement register renaming, to allow for speculative instruction execution, and to facilitate precise exceptions. A temporary storage location within reorder buffer 32 is reserved upon decode of an instruction that involves the update of a register to thereby store speculative register states. The results of speculatively executed instructions can be invalidated in the buffer before they are written to register file 30. It is noted that a particular instruction is speculatively executed prior to instructions which precede particular instruction program mode. Preceding instructions may be a branch instruction or an exception causing instruction, in which case the speculative results may be discarded by reorder buffer 32.

For each temporary storage location set up within reorder buffer 32, an area exists for an instruction tag associated with the instruction that involves the update of a register. Further, reorder buffer 32 may include a branch status operand/instruction tag comparator for comparing branch status operands against instruction tags stored within reorder buffer 32 as will be more fully described below.

Instruction control values, instruction tags, and immediate or displacement data provided at the output of decoder 20 are collectively routed directly to respective reservation stations 22. In one embodiment, each reservation station 22 is configured to hold instruction information (i.e., instruction control values, instruction tags, as well as operand values, operand tags, and/or immediate data) for up to three pending instructions awaiting issue to the corresponding functional unit. It is noted that for the embodiment of FIG. 1, each reservation station 22 is associated with a dedicated functional unit 24. Instructions dispatched to reservation stations 22 are executed by corresponding functional units 24.

Upon decode of a particular instruction, if a required operand is in a register location, register address information is routed to reorder buffer 32 and register file 30 simultaneously. Reorder buffer 32 contains temporary storage locations for results which change the contents of registers to thereby allow out of order execution. As noted above, the temporary storage location in reorder buffer 32 is reserved for each instruction which, upon decode, is determined to modify the contents of one of the registers within register file 30. Therefore, at various points during execution of a particular application program, reorder buffer 32 may have one or more locations which contain the speculative executed contents of a single given register. If following decode of a given instruction, it is determined that reorder buffer 32 has a previous location or locations assigned to a register used as an operand in the given instruction, the reorder buffer 32 forwards to the corresponding reservation station either: (1) the value in the most recently assigned location, or (2) an operand tag for the most recently assigned location if the value has not yet been produced by the functional unit that will eventually execute the previous instruction. If reorder buffer 32 has a location reserved for a given register, the operand value (or reorder buffer tag) is provided from the reorder buffer 32 rather than from register file 30. If there is no location reserved for a required register reorder buffer 32, the operand value is taken directly from register file 30. If the operand corresponds to a memory location, the operand value is provided to reservation station through load store unit 26.

As noted earlier, reservation stations 22 store instructions until the instructions are executed by corresponding functional units 24. An instruction is selected for execution if: (1) the operands of the instructions have been provided, and (2) the operands have not yet been provided for instructions which are within the same reservation station and which are prior to the instruction in program order. It is noted that when an instruction is executed by one of the functional units 24, the result of that instruction is passed directly to any reservation station 22 that is waiting for that result at the same time the result is passed to update reorder buffer 32. An instruction may be selected for execution and passed to a functional unit 24 during the clock cycle that the associated result is forwarded. Reservation stations 22 route the forwarded result through the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode unit 20. It is noted that the instruction tag associated with each decoded instruction follows the instruction into an associated functional unit. It is also noted that a floating point unit (not shown) may also be employed to accommodate floating point operations. Additionally, functional units 24 may be configured to perform address generation for load and store memory operations performed by load/store unit 26.

Each of the functional units also provide information regarding the resolution of the conditional branch instruction to branch status operand circuit 36. As will be more fully described below, branch status operand circuit 36 generates a branch status operand which is dependent upon the resolution of one or more conditional branch instructions.

Results produced by functional units 24 are sent to reorder buffer 32 where register values are being updated, and to load/store unit 26. If the result is to be stored in a register, reorder buffer 32 stores the result in the location reserved for the value of the register when the instruction was decoded. A plurality of result buses 40 are included for forwarding results from functional units 24 and load/store unit 26. Result buses 40 convey the result generated, as well as the reorder buffer tag identifying the instruction being executed.

Load/store unit 26 provides an interface between functional units 24 and data cache 28. In one embodiment, load/store unit 26 is configured with a load/store buffer having locations for data and address information for pending loads or stores. Load/store unit 26 performs dependency checking for memory load operations against pending store memory operations to ensure that data coherency is maintained. A memory operation is a transfer of data between microprocessor 10 and the main memory subsystem (not shown). Memory operations may be the result of an instruction which utilizes an operand stored in memory, or may be the result of a load/store instruction which causes the data transfer but no other operation.

Data cache 28 is a high speed cache memory provided to temporarily store data being transferred between load store unit 26 and main memory. It is understood that data cache 28 may be implemented in a variety of specific memory configurations including a set associative configuration.

Figure 2:
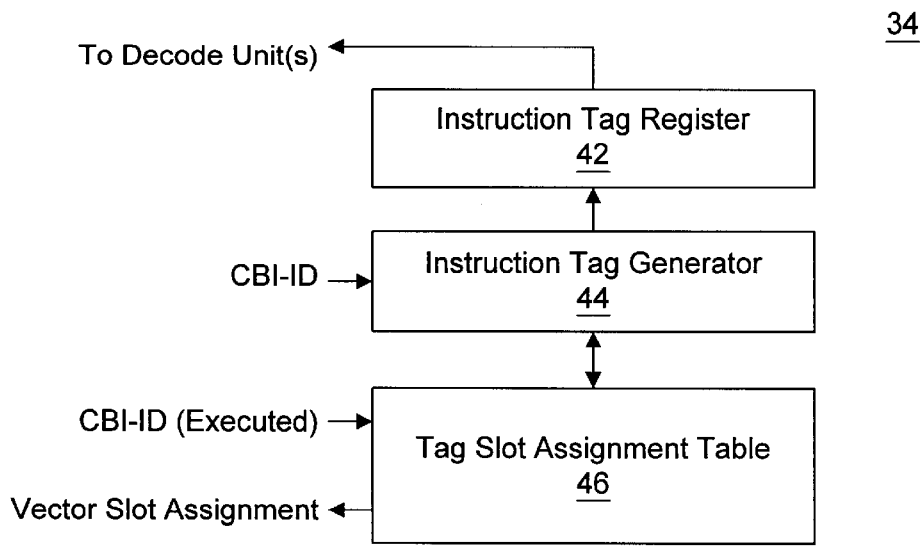
FIG. 2 is a block diagram of one embodiment of the instruction tag device shown in FIG. 1.

Turning now to FIG. 2, a block diagram of one embodiment of instruction tag circuit 34 is shown. Instruction tag circuit 34 includes an instruction tag register 42, an instruction tag generator 44, and instruction tag slot assignment table 46. Instruction tag slot assignment table 46 stores assignments information relating conditional branch instructions to 2-bit vector slots in the instruction tags. Instruction tag generator 44 accesses instruction tag slot assignment table 46 upon detection of one or more conditional branch instructions within a block of instructions provided to decoder 20 by instruction cache 16. More particularly, instruction tag generator 44 accesses instruction tag slot assignment table 46 to identify an unassigned instruction tag slot. Once an unassigned instruction tag slot is identified, it is assigned to detected conditional branch instruction. The assigned slot is used by instruction tag generator 44 to generate one or more instruction tags which are then stored within an instruction register 42 for subsequent issue to decoder 20.

Figure 3:
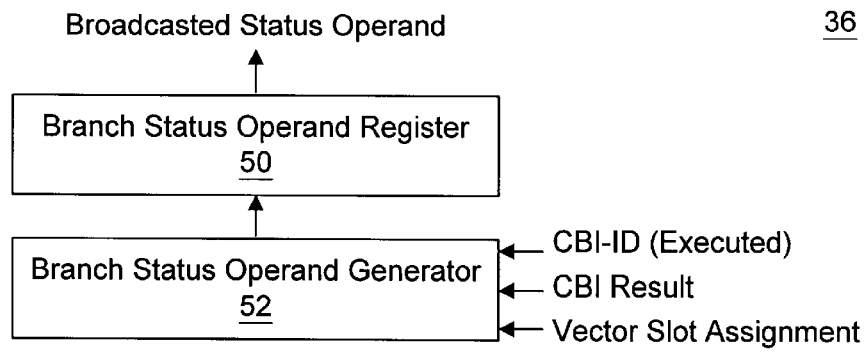
FIG. 3 is a block diagram of one embodiment of the branch status operand device shown in FIG. 1.

FIG. 3 is a block diagram of the branch status operand device 36 shown in FIG. 1. Branch status operand device 36 includes a branch status operand generator 52 coupled to a branch status operand register 50. Upon execution of a conditional branch instruction by one of the functional units 24, branch status operand generator generates a branch status operand which, in turn, is stored within register 50. The branch status operand indicates whether the executed conditional branch instruction is resolved as taken or not taken. Thereafter, the branch status operand stored within register 50 is broadcast throughout microprocessor 10 where it is compared against instruction tags associated with instructions issued from instruction decoder 20 regardless of whether the instructions have been executed or not.

Figure 4:
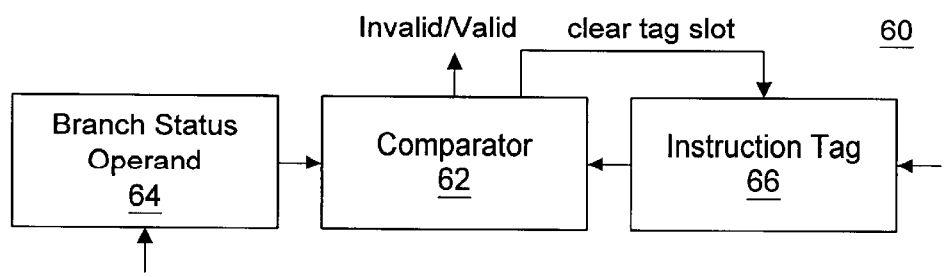
FIG. 4 is a block diagram of one embodiment of a status operand/tag comparing device employed in the microprocessor of FIG. 1.

FIG. 4 is a block diagram of a comparator circuit 60 for comparing the broadcasted branch status operand against an instruction tag of an issued instruction. The comparator circuit includes a comparator 62 coupled to receive a broadcasted branch status operand and instruction tag. Comparator 62 issues a signal which invalidates a tagged instruction when the comparison of the corresponding instruction tag and branch status operand indicates that the instruction is in the invalid path of execution as will be more fully described below.

By associating each issued but uncommitted instruction with a 2n bit instruction tag, up to n speculative paths corresponding to n conditional branch instructions, can be issued from decoder 20 and managed. Speculatively executed instructions can be easily invalidated if they are found to have been in an invalid path of execution. It is noted that the present invention also has application to microprocessors which can manage multiple branches issued in one clock cycle.

Each instruction tag is defined by 2n bits arranged as n 2-bit vectors. The branch status operand is 2n bits wide and arranged as n 2-bit vectors as well. Each 2-bit vector of the instruction tag and branch status operand consists of a high bit and low bit. When a vector of the instruction tag is assigned to a detected conditional branch instruction, the high bit of the assigned vector is set indicating its dependence upon and assignment to the detected conditional branch. After resolution of detected conditional branch instructions and subsequent comparison of broadcasted branch status operands with the instruction tags, the high bits of 2-bit vectors of certain issued instruction tags are cleared.

The low bit of the assigned 2-bit vector of the tags identifies whether an associated instruction is within the correct program path or not. In one embodiment, the low bit is set to indicate that the associated instruction is in the correct program path if the detected conditional branch instruction is resolved as taken. In contrast, the low bit is reset to indicate that the associated instruction is in the correct program path when the detected conditional branch instruction is resolved as not taken.

Shown below is one encoding embodiment of a 2-bit vector assigned to a detected conditional branch.

TABLE 1

| 2-bit vector | Tag Definition |
| --- | --- |
| 0X | Instruction not dependent on branch. |
| 10 | Instruction dependent on branch and requires branch to be not taken. |
| 11 | Instruction dependent on branch and requires branch to be taken. |

Since there are n 2-bit vectors, up to n branches corresponding to n conditional branch instructions may be issued and pending at any given time. While a conditional branch instruction remains unresolved, the assigned vector cannot be used for any other conditional branch instruction.

When one or more conditional branch instructions are finally resolved, the taken or not taken status of the one or more resolved branches may be broadcast in the 2n bit branch status operand. The broadcast is made to and received by all reservation stations 22, the reorder buffer 32, and the load store unit 26. The branch status operand is compared to all instruction tags associated with issued instructions regardless of whether they have been executed or not. If an instruction depends on a branch that does resolve in the direction required by the associated instruction tag vector, the instruction is invalidated. On the other hand, if the branch does resolve in the direction required by the instruction tag, the vector assigned to the branch is cleared and its slot is indicated as unassigned within the instruction tag assignment table 46 thereby allowing the slot to be used for subsequent conditional branch instructions detected in instruction decoder 20. Table 2 shows one embodiment of the encoding for a particular 2-bit vector of a branch status operand for a resolved conditional branch instruction.

TABLE 2

| 2-bit vector | Branch Status Definition |
| --- | --- |
| 0X | Branch unresolved or vector not assigned. |
| 10 | Branch resolved as not taken. |
| 11 | Branch resolved as taken. |

Table 3 below shows the actions taken when corresponding 2-bit vectors of an instruction tag and a branch status operand are compared.

TABLE 3

| 2-bit vector (Instruction Tag) | 2-bit vector (Branch status operand) | Action |
| --- | --- | --- |
| 0X | XX | None; no dependency. |
| XX | 0X | None; no branch resolution. |
| 10 | 10 | Reset 2-bit vector of Instruction Tag. |
| 10 | 11 | Invalidate instruction. |

TABLE 3-continued

| 2-bit vector (Instruction Tag) | 2-bit vector (Branch status operand) | Action |
| --- | --- | --- |
| 11 | 10 | Invalidate instruction. |
| 11 | 11 | Reset 2-bit vector of Instruction Tag. |

This mechanism insures that speculatively issued instructions can be invalidated even if they are dependent on multiple conditional branch instructions which do not resolve quickly enough in program order. Instruction results are not allowed to be committed (i.e., stored in register file 30) until all branch dependencies affecting the instruction have been resolved.

Figures 6A, 6B:
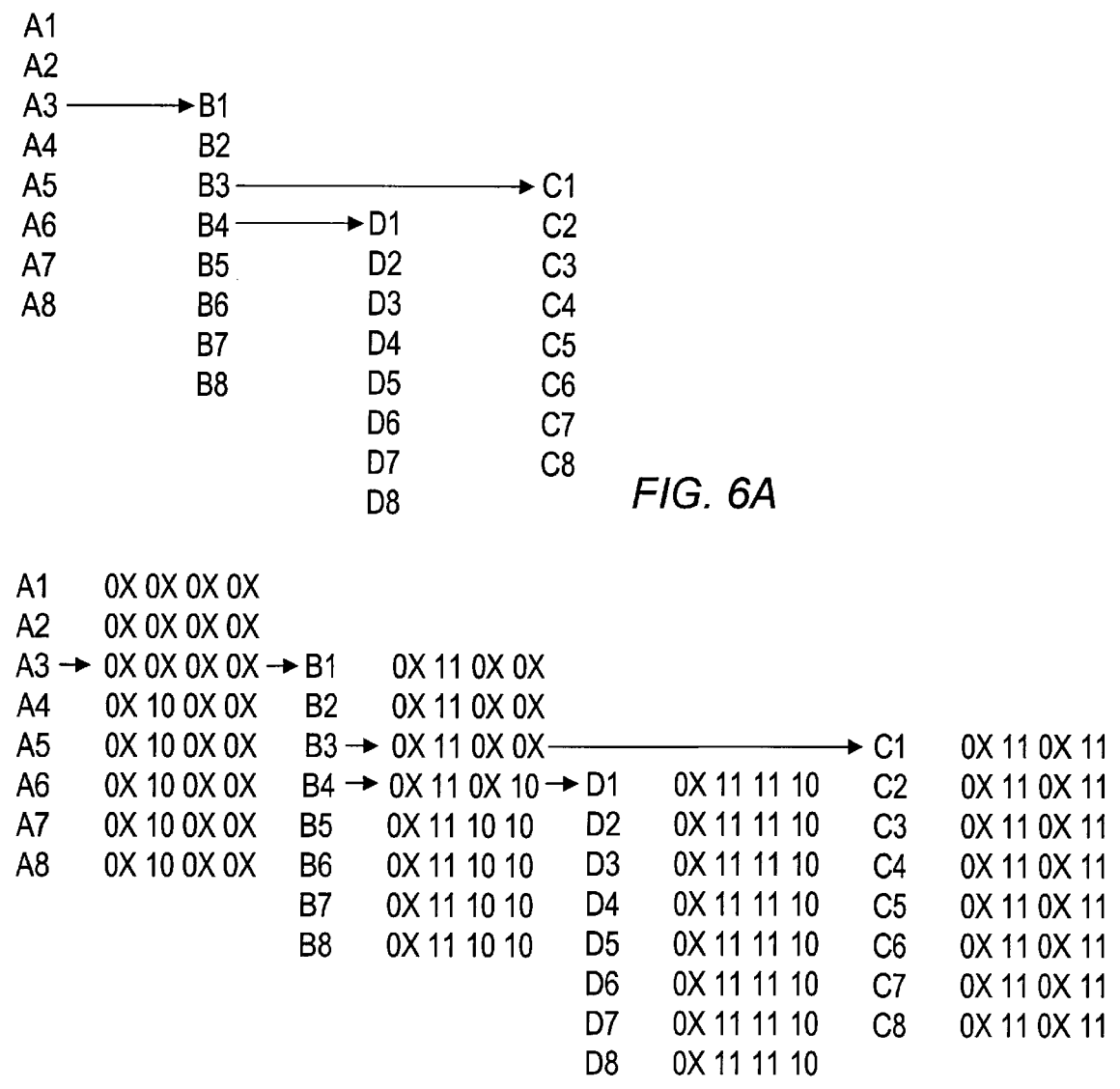

FIG. 6A shows a portion of a program code containing several conditional branch instructions. FIG. 6B shows the same portion of program code with associate instruction tags generated in accordance with one aspect of the present invention. In FIG. 6A, conditional branch instructions are defined by instruction A3, B3 and B4. If, for example, conditional branch instruction A3 is taken, the correct next instruction to be executed is B1. If conditional branch instruction A3 is resolved as not taken, the correct next instruction to be executed is instruction A4.

Instruction blocks A1–A8, B1–B8, D1–D8, and C1–C8 represent blocks of eight consecutive instructions issued from instruction cache 16 of FIG. 1. For the purposes of explanation of the present embodiment, it will be presumed that conditional branch instruction A3 is the first conditional branch instruction to be detected within instruction decoder 20. It is further presumed that the instruction tag and the branch status operand are defined by 8-bit operands of four 2-bit vectors. Accordingly, the scheme represented in FIG. 6A and FIG. 6B represents one instruction tag and branch status operand encoding for which can manage four separate conditional branch instructions can be managed.

Insofar as A3 is the first conditional branch instruction detected by decoder 20, instructions A1–A3 are tagged with an instruction tag indicating a no-branch dependencies. However, since A3 is a conditional branch instruction, A4–A8 must be tagged with an instruction tag indicating that these instructions are in the correct program path if branch instruction A3 is resolved as not taken. After instructions A1–A8 are appropriately tagged as shown, instruction decoder 20 issues instructions A1–A8 along with their associated instruction tags to reservation stations 22. It is noted that in FIG. 6B, instructions A4–A8 have an instruction tag with a 2-bit vector assigned to conditional branch instruction A3 having a set high bit and a set low bit. As noted above, this encoding of the 2-bit vector indicates that the associated instructions are in the correct program if the dependent branch is resolved as not taken.

B1–B8 are subsequently fetched in the example from instruction cache 16 and provided to instruction decoder 20. In this next instruction block, two conditional branch instructions B3 and B4, are detected by instruction decoder 20. However, since B1–B3 depend upon conditional branch instruction A3 as taken, B1–B3 are tagged as shown. Namely, the 2-bit vector assigned to conditional branch A3 is encoded to indicate that B1–B3 are in the correct program path if conditional branch instruction A3 is resolved as taken. Upon detection of conditional branch instruction B3, a second 2-bit vector is assigned thereto. Moreover, upon detection of conditional branch instruction B4, a third 2-bit vector is assigned thereto.

Instruction B3 branches conditionally to C1 and instruction B4 branches conditionally to instruction D1. Instruction B4 is tagged with instruction tag having a newly assigned 2-bit vector indicating that it is dependent upon conditional branch instruction B3. Further, it is noted that this same instruction tag has a 2-bit vector indicating that instruction B4 is also dependent upon resolution of conditional branch instruction A3. Thus, B4 is the first instruction with an instruction tag having two vectors indicating dependence upon multiple conditional branch instructions. Instructions B5–B8 are likewise tagged to indicate that they are in the correct program path if conditional branch instruction A3 is resolved as taken and conditional branch instruction B3 is resolved as not taken. Once instructions B1–B8 are appropriately tagged, instructions B1–B8 are issued from instruction decoder 20 to reservation station 22.

Instruction blocks D1–D8 and C1–C8 are similarly tagged to indicate their dependence upon multiple conditional branch instructions. Instructions dispatched from decoder 20 can continue down any path desired so long as the 2-bit vector slots are available for allocation to conditional branch instructions. In this sense, instructions can be issued regardless of whether dependent branch instructions are taken or not so long as there are enough machine resources (e.g., reservation stations 22 and functional units 24) to support them. In practice, instructions A4–A7 can be issued even if conditional branch instruction A3 was predicted to be taken since it may take a few clock cycles to fetch the new instruction stream. This might consume machine resources that might be used for later. However, the added consumption may be mitigated by the time penalty for mispredicted branches described within the background of the specification. The present technique will also allow a set of whole instructions to be issued simultaneously, without restricting the number of branch instructions in this set.

FIG. 6C shows branch status operands associated with conditional branch instructions A3, B3, and B4 which are generated after resolution of these conditional branch instructions by functional units 24. For example, if conditional branch instruction B4 is executed and resolved as taken, the associated branch status operand shown is generated and broadcast throughout microprocessor 10. When the branch status operand associated with executed conditional branch instruction B4 is compared, for example, against the instruction tags of instructions B5–B8 these instructions will be invalidated since the low bits of the corresponding 2-bit vectors are unequal. In contrast, the 2-bit vector assigned in instruction tags associated with instructions D1–D8 and C1–C8 will be cleared since they compare equally to the corresponding 2-bit vector of the branch status operand. Clearing this slot removes the dependency of these instructions upon conditional branch instruction B4. It is noted, again, that instructions D1–D8 and C1–C8 cannot be committed since they still remain dependent upon resolution of conditional branch instructions A3 and B3.

It is contemplated within the present invention that two conditional branch instructions may be resolved within the same cycle by separate functional units 24. For example, if conditional branch instruction A3 is resolved as taken and conditional branch instruction B3 is resolved as not taken, branch status operand shown in FIG. 6C is generated and broadcast throughout microprocessor 10. It is noted that two vector slots have been encoded to identify resolution of the assigned conditional branch instructions A3 and B3. A comparison of this branch status operand with instruction tags associated with non-committed instructions results in the invalidation of instructions A4–A8 and C1–C8.

Figure 5A:
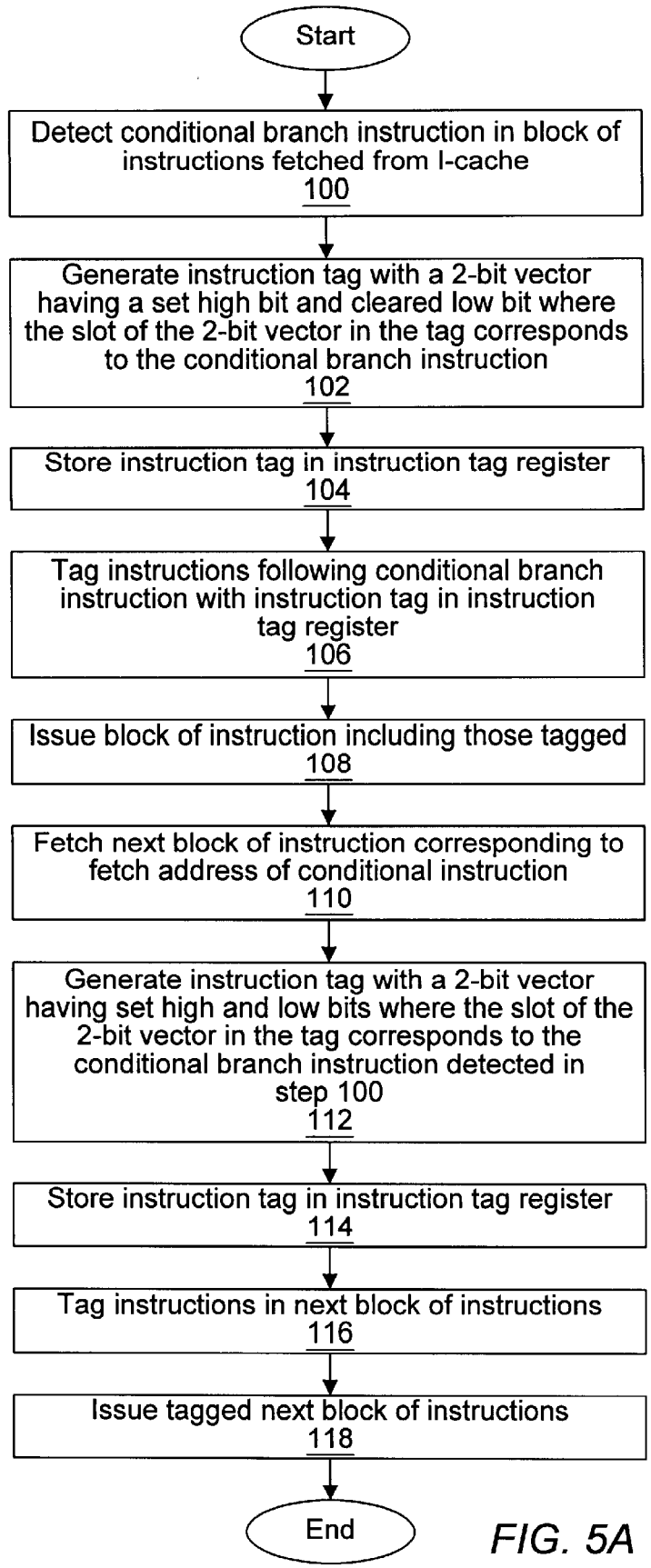
FIG. 5A is a flow chart illustrating one embodiment of tagging speculatively issued instructions in accordance with the present invention.
Figure 5B:
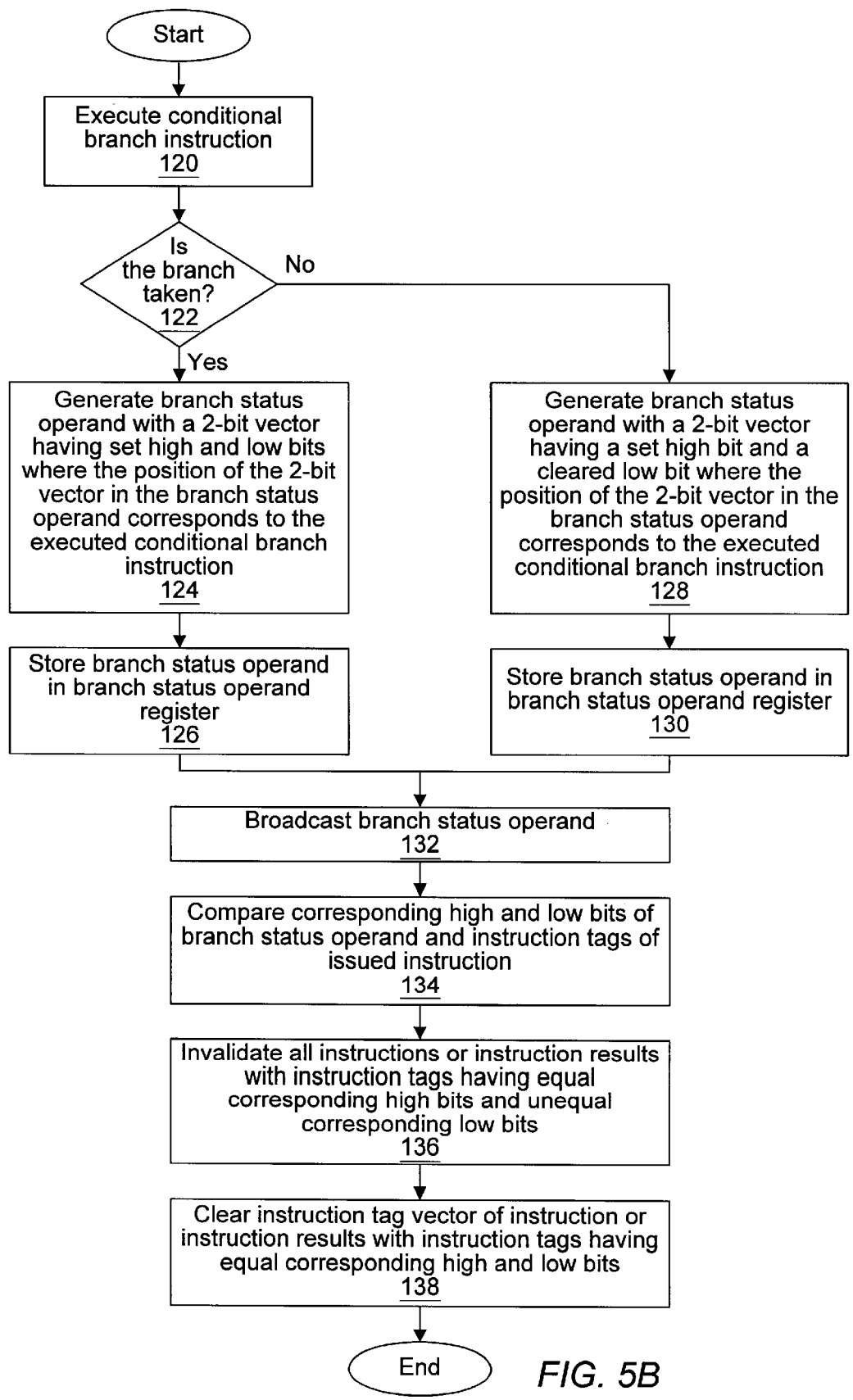
FIG. 5B is a flow chart illustrating one embodiment of generating and comparing branch status operands in accordance with the present invention.

FIGS. 5A and 5B illustrate operational aspects of the present invention via instruction tag circuit 34, branch status operand circuit 36, and comparator circuit 60 shown in FIGS. 2–4, respectively. In FIG. 5A, at step 100, decoder 20 detects a conditional branch instruction (e.g., A3 of FIG. 6A) in a first block of instructions (e.g., A1–A8 of FIG. 6A) received from instruction cache 16. In response, instruction tag generator 44 accesses table 46 to select and assign a slot to the detected conditional branch instruction. Thereafter, instruction tag generator 44 generates a first instruction tag with a first 2-bit vector, the instruction tag slot of which is assigned to the detected conditional branch instruction via table 46. The high bit of the first 2-bit vector is set and the low bit of the 2-bit vector is cleared as shown in step 102. This instruction tag is stored in instruction tag register 42 prior to dispatch to instruction decoder 20. Instructions (e.g., A4–A8 of FIG. 6A) which follow the detected conditional branch instruction in program order are tagged with the contents of register 42 as shown in step 106. Thereafter, in step 108, decoder 20 issues the first block of instructions including those tagged.

In step 110, a next block of instructions (e.g., B1–B8 of FIG. 6A) is fetched from instruction cache 16 into decoder 20. Instruction tag generator 44 in this embodiment maintains a history of previously issued conditional branch instructions in order to keep track of previously generated instruction tags. In step 112, the instruction tag generator 44 generates a second instruction tag with a second 2-bit vector, the instruction tag slot of which equals that of the first 2-bit vector. The high and low bits of the second 2-bit vector are set high thereby indicating instructions associated therewith are in the correct path if the previously detected conditional branch instruction is resolved as taken. The generated second instruction tag is stored within instruction tag 42 as shown in step 114. In step 116, the contents of instruction tag register 42 are used to tag the instructions within the next block before they are issued from decoder 20 as shown in step 118.

It is noted that subsequent instruction blocks could be fetched according to predictions provided by branch prediction unit 14 of FIG. 1 if employed. Namely, if branch prediction unit 14 predicts that the conditional branch instruction detected within the first block is taken, then the third block of instructions fetched from instruction cache 16 may be those in program order and subsequent to the second block of instructions (i.e., B9–B16). On the other hand, if branch prediction unit 14 predicts the first conditional branch instruction as not taken, the next block of instructions may be those subsequent to and in program order to the first block instruction (i.e., A9–A16).

FIG. 5B illustrates operational aspects of the branch status operand circuit 36 and comparator circuit 60 shown in FIGS. 3 and 4. In steps 120 and 122, a conditional branch instruction is executed and resolved by one of the functional units 24 as either taken or not taken. Branch status operand circuit 36 generates and broadcasts a branch status operand accordingly. In particular, branch status operand generator 52 generates a branch status operand in step 124 with a third 2-bit vector having set high and low bits if the conditional branch instruction is resolved as taken. The third 2-bit vector is positioned in the branch status operand in a slot identified by table 46 as being assigned to the executed conditional branch instruction. Table 46 provides the slot assignment in response to receiving an identification of the executed conditional branch instruction from, in one embodiment, the functional unit 24 which executed the conditional branch instruction. If the executed conditional branch instruction is resolved as not taken, then the third 2-bit vector is generated with a set high bit and a cleared low bit as shown in step 128. Either way, the generated branch status operand including the third 2-bit vector, is stored within branch status operand register 50 as shown in either steps 126 or 130. Thereafter, in step 132, the generated branch status operand is broadcast throughout microprocessor 10.

The broadcasted branch status operand is compared against all instruction tags associated with issued instructions regardless of whether these instructions are executed or not. To this end, a comparison of the broadcasted branch status operand is made with instruction tags within reservation stations 22, reorder buffer 32, load store unit 26, etc. In one embodiment, comparator circuit 60 may be found within each of these units. Comparator circuit 60 includes a comparator 62 which compares the broadcasted branch status operand against an individual instruction tag associated with an issued instruction stored, for example, in reorder buffer 32. More particularly, as shown in step 134, corresponding 2-bit vectors of the broadcasted branch status operand and instruction tag are compared within comparator 62. If corresponding 2-bit vectors within the branch status operand and instruction tag both have set high bits and unequal low bits, then comparator 62 generates a signal invalidating the instruction associated with the compared instruction tag as shown in step 136. If the corresponding 2-bit vectors within the branch status operand and instruction tag both have set high bits and equal low bits, then comparator 62 issues a signal clearing the corresponding 2-bit vector within the compared instruction tag as shown in step 138. This removes dependency of the associated instruction from the executed conditional branch instruction. Likewise, a clear tag/slot signal generated by comparator 62 is provided to table 46 which, in turn, clears assignment of the 2-bit vector slot to the executed conditional branch instruction so that the slot may be reserved for future conditional branch instructions received by decoder 20.

FIG. 1 shows branch prediction unit 14. In one embodiment of the present invention, branch prediction unit 14 is not needed insofar as instructions from both the taken and not taken instruction paths are issued for execution. However, as noted earlier branch prediction unit 14 can be employed in one embodiment to predict conditional branch instruction resolution prior to their dispatch to decoder 20. In the above example, the block of instructions fetched after detection of the conditional branch instruction within the first block of instructions, did not depend upon operation of the branch prediction unit 14. However, in another embodiment, the branch prediction unit could have predicted that the detected conditional branch instruction is taken. In this embodiment, operation of the microprocessor would have proceeded generally along the same lines of the examples set forth above. However, if the branch prediction unit 14 prediction unit 14 predicted the detected branch instruction as not taken, then the next block instruction would have been that subsequent to the first branch of instructions in program order (i.e., instructions A9–A16). This feature has the added advantage of combining branch prediction with the technique for tagging and invalidating speculatively issued instructions.

Numerous variations and modifications will become apparent to those skilled in the art once the above disclosure is fully appreciated. It is intended that the following claims be interpreted to embrace all such variations and modifications.

What is claimed is:

1. A method of tagging speculatively issued instructions within a microprocessor comprising:
    fetching a plurality of consecutive instructions;
    detecting a conditional branch instruction within said plurality of consecutive instructions;
    tagging a first instruction with a first tag corresponding to said conditional branch instruction in response to detecting the conditional branch instruction, wherein said first instruction corresponds to a target address of said conditional branch instruction, and wherein the first tag indicates that the first instruction is in correct program order if the conditional branch instruction is taken; and
    tagging remaining instructions within said plurality of consecutive instructions subsequent to said conditional branch instruction with a second tag corresponding to said conditional branch instruction in response to detecting the conditional branch instruction, wherein the second tag indicates that said remaining instructions are in correct program order if the conditional branch instruction is not taken.

2. The method of claim 1 further comprising decoding and subsequently executing the conditional branch instruction, and resolving whether the conditional branch instruction is taken or not taken.

3. The method of claim 2 further comprising generating a branch status operand corresponding to the executed conditional branch instruction, wherein the branch status operand is generated in response to resolving whether the conditional branch instruction is taken or not taken, and wherein the branch status operand indicates whether the conditional branch instruction is taken or not taken.

4. The method of claim 3 further comprising comparing the branch status operand with the first and second tags, wherein the first instruction is invalidated if the branch status operand does not compare equally with the first tag, or wherein the remaining instructions are invalidated if the branch status operand does not compare equally with the second tag.

5. The method of claim 1 further comprising:
    invalidating said first instruction in response to detecting said conditional branch instruction is not taken; and
    invalidating said remaining instructions in response to detecting said conditional branch instruction is taken.

6. The method of claim 1 wherein each of said first and second tags comprise 2n-bits and are defined by n 2-bit vectors, wherein a position of a first 2-bit vector in the first tag corresponds to the conditional branch instruction, and wherein a position of a second 2-bit vector in the second tag corresponds to the conditional branch instruction.

7. The method of claim 6 wherein the position of the first 2-bit vector in the first tag equals the position of the second 2-bit vector in the second tag.

8. The method of claim 7 wherein a first bit of the first and second 2-bit vectors of the first and second tags is set to a first state.

9. The method of claim 8 wherein the second bit of the first 2-bit vector of the first tag is set to the first state, and wherein a second bit of the second 2-bit vector of the second tag is set to a second state, wherein said first state and said second state are not equal.

10. A method comprising:
    fetching a first plurality of consecutive instructions from a storage device;
    detecting a conditional branch instruction within the first plurality of consecutive instructions, wherein the conditional branch instruction identifies a target address;

tagging remaining instructions within said plurality of consecutive instructions subsequent to said conditional branch instruction with a first instruction tag which corresponds to said conditional branch instruction;

fetching a second instruction, wherein the second instruction is identified by the target address;

tagging the second instruction with a second instruction tag which corresponds to said conditional branch instruction.

11. The method of claim 10 wherein the first and second instruction tags are defined by n 2-bit vectors.

12. The method of claim 11 further comprising assigning a slot of a 2-bit vector within the first and second instruction tags to the conditional branch instruction.

13. The method of claim 12 wherein the 2-bit vector of the first instruction tag includes a first bit set to a first state and a second bit set to a second state.

14. The method of claim 13 wherein the 2-bit vector of the second instruction includes first and second bits set to the first state.

15. The method of claim 10, further comprising:

executing the conditional branch instruction;

generating a branch status operand in response to executing the conditional branch instruction, wherein the branch status operand indicates whether the conditional branch instruction is resolved as taken or not taken;

comparing the branch status operand to the first and second instruction tags; and invalidating said tagged first instruction or said remaining instructions in response to comparing the branch status operand to the first and second instruction tags.

16. The method of claim 15 wherein the branch status operand is defined by n 2-vectors.

17. The method of claim 16 wherein each 2-bit vector of the branch status operand is compared with corresponding 2-bit vectors of the first and second instruction tags.

18. The method of claim 17 wherein either said first instruction or said remaining instructions are invalidated when one of the 2-bit vectors of the branch status operand does not compare equally to a corresponding 2-bit vector of the first or second instruction tags.

19. A microprocessor comprising:

a fetch unit configured to fetch a plurality of consecutive instructions;

an instruction decoder configured to receive and decode said plurality of consecutive instructions, wherein said plurality of consecutive instructions includes a conditional branch instruction, wherein said conditional branch instruction includes a branch target address identifying a branch target instruction;

a plurality of functional units configured to execute decoded instructions received from the instruction decoder;

an instruction tag circuit coupled to said instruction decoder and configured to generate first and second instruction tags corresponding to said conditional branch instruction, wherein said instruction tag circuit is configured to tag remaining instructions within said plurality of consecutive instructions following said conditional branch instruction in sequence with said first instruction tag, and wherein said instruction tag circuit is configured to tag said branch target instruction with said second instruction tag.

20. The microprocessor of claim 19, further comprising a branch status operand circuit configured to generate a branch status operand in response to one of said functional units executing said conditional branch instruction, wherein the branch status operand indicates whether the conditional branch instruction is taken or not taken.

21. The microprocessor of claim 20 wherein said microprocessor is configured to compare said branch status operand with said first and second tags, wherein said remaining instructions are invalidated if said branch status operand does not compare equally with said first tag, and wherein said second instruction is invalidated if said branch status operand does not compare equally with said second tag.

22. The microprocessor of claim 19, wherein said microprocessor is configured to invalidate said remaining instructions in response to detecting said conditional branch instruction is taken; and wherein said microprocessor is configured to invalidate said second instruction in response to detecting said conditional branch instruction is not taken.

23. The microprocessor of claim 19 wherein each of said first and second tags comprise 2n-bits and are defined by n 2-bit vectors, wherein a position of a first 2-bit vector in said first tag corresponds to said conditional branch instruction, and wherein a position of a second 2-bit vector in said second tag corresponds to said conditional branch instruction.

24. The microprocessor of claim 23 wherein said position of said first 2-bit vector in said first tag equals said position of said second 2-bit vector in said second tag.

25. The microprocessor of claim 24 wherein a first bit of said first and second 2-bit vectors of said first and second tags is set to a first state.

26. The microprocessor of claim 25 wherein a second bit of said first 2-bit vector of said first tag is set to said first state, and wherein a second bit of said second 2-bit vector of said second tag is set to a second state, wherein said first state and said second state are not equal.

* * * * *

UNITED STATES PATENT AND TRADEMARK OFFICE
CERTIFICATE OF CORRECTION

PATENT NO.   : 6,289,442 B1  
DATED        : September 11, 2001  
INVENTOR(S)  : Creigton Asato It is certified that error appears in the above-identified patent and that said Letters Patent is hereby corrected as shown below:

Column 15,  
Line 33, please delete "2-vectors" and insert -- 2-bit vectors -- in place thereof.

Signed and Sealed this

Fourteenth Day of May, 2002

Attest:

JAMES E. ROGAN  
Attesting Officer  *Director of the United States Patent and Trademark Office*